United States Patent Office 3,468,816
Patented Sept. 23, 1969

3,468,816
METHOD OF PURIFYING AN IMPURE QUATERNARY AMMONIUM SALT BY ADDITION OF AN EPOXIDE
William H. Thompson, Downers Grove, and Edward G. Ballweber, Chicago, Ill., assignors to Nalco Chemical Company, Chicago, Ill., a corporation of Delaware
No Drawing. Filed July 24, 1964, Ser. No. 385,050
Int. Cl. C08g *30/08;* C07c *91/26*
U.S. Cl. 260—2          3 Claims

ABSTRACT OF THE DISCLOSURE

Impure quaternary ammonium compounds are purified by reacting them with certain epoxides. This reduces any amine contaminants whereby the impure quaternary ammonium compound contains only quaternary ammonium salts.

---

The present invention relates to novel quaternary ammonium compounds and their mode of preparation. More specifically, the instant invention is concerned with quaternary ammonium compounds formed by reaction of an amine and an epoxide compound, uses of the resultant products as antistatic and heat-stabilizing agents, and a method of synthesizing such quaternaries whereby optimum yields are obtained.

Quaternary ammonium salts are generally synthesized by reacting an amine with sufficient alkylating agent until the nitrogen atom is fully substituted with alkyl groups. However, quaternary ammonium compounds when produced by such conventional means, that is, by reaction of amine with an alkyl halide, sulfate, sulfonate, etc., have certain drawbacks and deficiencies. Generally, such product quaternaries are impure. That is to say, since the reaction cannot be driven to completion by this mode of preparation, the product quaternary salts usually contain a large proportion of unreacted amine and amine salts. In many instances, the total content of amine and amine salts runs as high as 40%, and generally ranges from about 5 to about 40% by weight of the total weight of reaction product. The presence of the aforementioned impurities causes various problems when the product quaternaries are employed for some additive end use. For example, certain quaternaries have been found to possess limited use as antistatic agents. However, the presence of amine and amine salt impurities in the useful quaternary antistat compound tends to char a base material, such as a vinyl resin, when the antistat and resin are being heat-milled together. The amine or amine salt impurities are a further detriment when added along with a quaternary antistat in that such impurities quite often deleteriously affect the antistatic performance of the quaternary, and oftentimes counteract the latter's effectiveness.

In like manner, certain compounds are used to heat-stabilize vinyl resins. That is, small amounts of materials are often added to vinyl resins to prevent breakdown and deterioration and subsequent color darkening of the vinyl resins when they are subjected to heat treatments of varying degrees. Again, a drawback has been noted in that the effectiveness of these prior art compounds in heat stabilizing vinyl resins is sometimes minimal. In addition, ancilliary side effects sometimes occur which deleteriously affect the resin as rendering it more opaque.

It would therefore be a benefit to the art if a substantially pure quaternary could be produced, that is, a product containing little, if any, impurities comprising unreacted amines and amine salts. Further, if a new class of quaternaries could be readily produced by a simple and efficient method whereupon substantially complete conversion to quaternary salt was achieved, such compositions would find ready acceptance in the art, and particularly in a product use such as in an antistatic process. An added advantage would accrue if the quaternary also found use as a heat-stabilizing agent for vinyl resins.

It, therefore, becomes an object of the invention to provide new and useful quaternary ammonium salts and an improved method of preparing such salt compounds.

Another object of the invention is to provide amine quaternaries by reaction of certain amines and epoxides in such a manner that substantially no impurities are present at termination of the reaction.

Yet another object of the invention is to provide new and useful quaternary ammonium salts which have excellent activity as antistatic reagents.

A special object of the invention is to provide quaternary ammonium products which have excellent activity in improving heat-stabilization of vinyl resins susceptible to adverse heat effects.

Other objects will appear hereinafter.

In accordance with the invention, a new class of novel quaternary ammonium compounds has been discovered. In their broadest aspect, these quaternary ammonium compounds are products which have been made by reaction of an organic amine capable of acting as a Lewis base and an organic epoxide-containing compound. The product quaternaries are further characterized as compounds containing at least one hydroxide radical in the cation moiety of the quaternary compound.

Preferred quaternary ammonium salts fall within one of the following structural formulae:

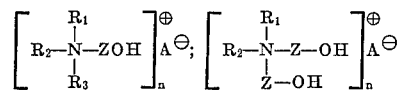

and

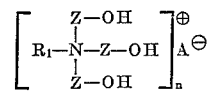

where $R_1$, $R_2$ and $R_3$ when they are taken individually represent a member selected from the group consisting of alkyl radicals containing 1–22 carbon atoms, alkenyl radicals containing 1–22 carbon atoms, and five to six-membered cyclic radicals, and where $R_1$, $R_2$ and $R_3$ or $R_1$ and $R_2$ when taken together with the corresponding nitrogen atom constitute a cyclic radical containing a ring nitrogen selected from the group consisting of five and six-membered ring molecules. Z is an organic radical derived from an epoxide reactant. A is an anion of a Lewis acid, and $n$ is an integer ranging from 1 to 3.

For a better understanding of the quaternary compounds of the invention, the simplest approach is a discussion centered about the individual reactants of amine and epoxide-containing compounds.

The amine reactants may be chosen from a wide variety of substances. Preferred amines have the general formula:

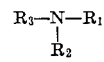

where $R_1$, $R_2$ and $R_3$ represent individually or as a group any of the radicals as previously defined or a hydrogen radical. In at least one occurrence among $R_1$, $R_2$ and $R_3$, there is present a carbon-containing radical of the type already defined attached to the nitrogen atom in the above formula.

The amine reactant may be cyclic or acrylic compound. Representative amines include those shown in Table I.

TABLE I 1. n-Dodecyl amine
2. n-Tetradecyl amine
3. n-Hexadecylamine
4. Lauryl amine
5. Myristyl amine
6. Palmityl amine
7. Stearyl amine
8. Oleyl amine
9. Coconut oil amine
10. Tallow amine
11. Hydrogenated tallow amine
12. Cottonseed oil amine
13. Dilauryl amine
14. Dimyristyl amine
15. Dipalmityl amine
16. Distearyl amine
17. Dicoconut amine
18. Dihydrogenated tallow amine
19. Octyl dimethyl amine
20. Octadecyl dimethyl amine
21. Octadecyl methyl benzyl amine
22. Hexyl diethyl amine trilauryl amine
23. Tricoconut amine
24. Tricaprylyl amine
25. Soya amine (hexadecyl, 10%; octadecyl, 10%; octadecenyl, 35%; octadecadienyl, 45%)
26. Methyl amine
27. Ethyl amine
28. Diethyl amine
29. Morpholine
30. Butyl amine
31. Isopropylamine
32. Di-isopropylamine
33. N-methyl morpholine
34. Triethylamine
35. Aminoethyl ethanolamine
36. Diethanolamine
37. Diethyl ethanolamine
38. Di-isopropanol amine
39. Dimethyl ethanolamine
40. Dimethyl isopropanolamine
41. N-hydroxy ethyl morpholine
42. N-methyldiethanolamine
43. Monoethanolamine
44. Monoisopropanolamine
45. Triethanolamine
46. Tri-isopropanolamine
47. 1,1-dihydroxymethyl ethylamine
48. 1,1-dihydroxymethyl n-propylamine
49. Polyglycolamine ($H_2NCH_2CH_2(OCH_2CH_2)_nOH$ $n=1$ to 10)
50. Pyrrolidone
51. 5-methyl-2-oxazolidone
52. 2-oxazolidone
53. Imidazole
54. 5-benzimidazole
55. 2-hydroxyethyl imidazole
56. 2-methyl imidazole
57. Caprolactam
58. Pyrazine
59. Pyridine
60. Piperidine
61. 1-(2 hydroxyethyl)-2 - N - heptadecenyl - 2-imidazoline
62. 2-heptadecyl-2-imidazoline
63. 2-cyanomethyl-2-imidazoline
64. 1-(2-hydroethyl)-2-N-alkyl-2 - imidazoline (alkyl radical=11–17 carbon atoms)
65. Cyclohexyl amine Table II below lists just a few of the epoxide reactants which may be added to any of the just-listed amines or others falling within the general structural amine formula. Preferred epoxide reactants have an epoxide equivalent of at least 70 and more preferably have an epoxide equivalent of 140 and contain 1.0–9.0 epoxide groups per molecule. The more preferred epoxide-containing compounds have an epoxide equivalent of at least 175 and contain 1.0–9.0 epoxide groups per molecule. The most preferred epoxide reactants are epoxy resins which have a terminal epoxide group and an epoxide equivalent of at least 175 and contain 1.4–8.0 epoxide groups per molecule. Representative members of this group as well as other epoxy compounds which may be used in the invention are listed below in Table II.

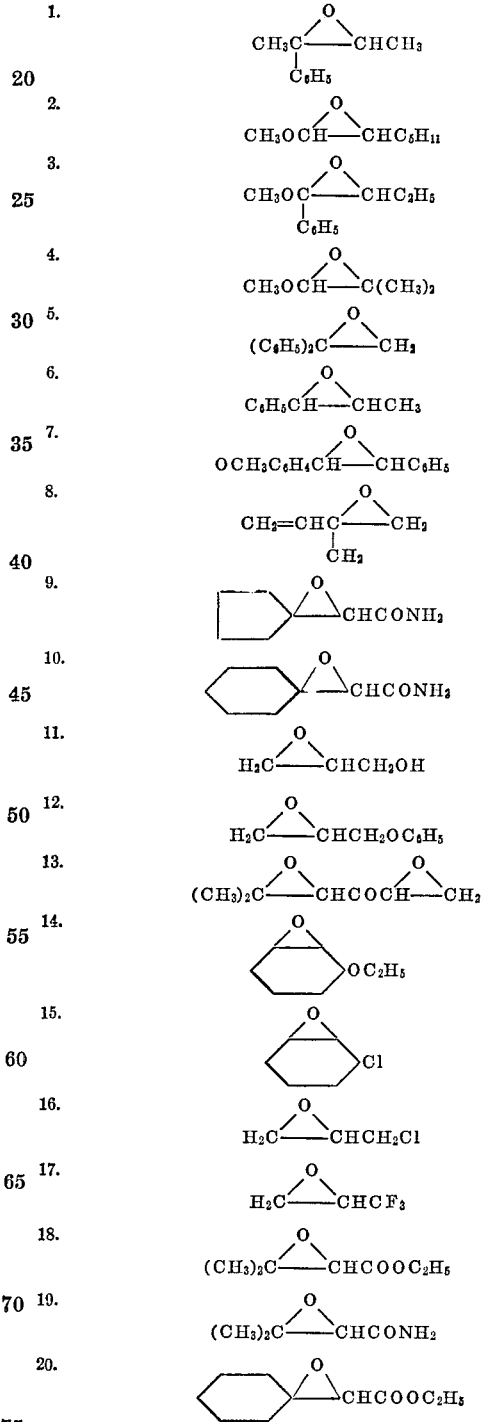

TABLE II

TABLE II—Continued

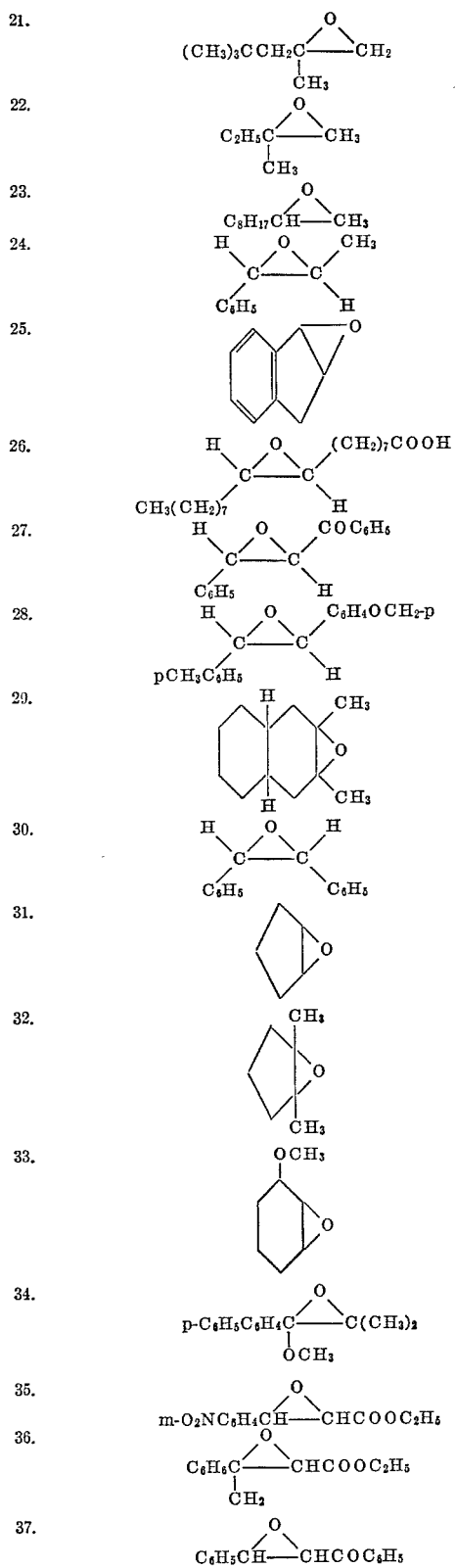

38. "Epi-Rez" epoxy resin—Epoxy equivalent=190–200*
39.

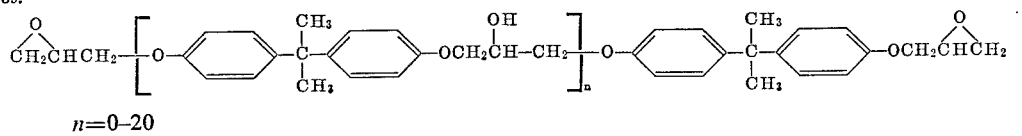

$n=0-20$

40. "Epoxol" epoxy resin*
41. "Admex 711"—epoxidized soybean oil
42. "Epon 828" epoxy resin*
43.

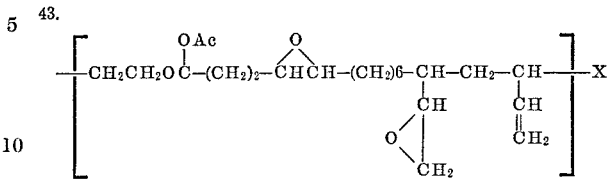

(Ac=acetal, average molecular weight=1500)

44. Butadiene diepoxide
45. Butylene oxide
46. Epoxidized fatty glyceride—
   Epoxy equivalent=190–200
47. Butadiene dimer diepoxide 48.
49.
50.

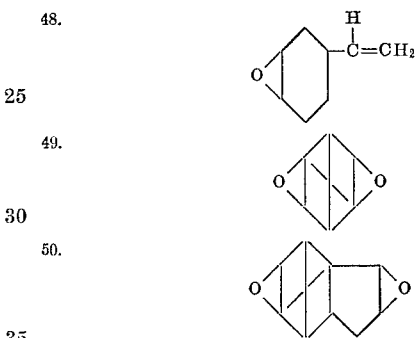

*Reaction of epichlorohydrin and bis(4 hydroxy phenyl) dimethylmethane.

Table III below lists a few of the quaternary ammonium compounds of the invention which may be formed by appropriate reaction of an amine listed in Table I and epoxide from Table II. A variety of other quaternary ammonium compounds following the scope of the invention may be likewise synthesized by reaction of still other amines and epoxides.

TABLE III

|  | Amine reactant No. | Epoxide reactant No. |
|---|---|---|
| 1 | 25 | 38 |
| 2 | 45 | 38 |
| 3 | 53 | 38 |
| 4 | 35 | 38 |
| 5 | 61 | 38 |
| 6 | 65 | 38 |
| 7 | 62 | 38 |
| 8 | 9 | 31 |
| 9 | 9 | 38 |
| 10 | 9 | 45 |
| 11 | 9 | 47 |
| 12 | 8 | 5 |
| 13 | 25 | 1 |
| 14 | 29 | 38 |
| 15 | 50 | 43 |
| 16 | 8 | 42 |
| 17 | 12 | 40 |
| 18 | 22 | 41 |
| 19 | 22 | 39 |
| 20 | 23 | 44 |

The quaternary ammonium salts of the invention may be formed by simply reacting the appropriate number of equivalents of epoxide and moles of amine sufficient to yield a quaternized amine compound, that is, a compound whose nitrogen atom has its valences fully satisfied by organic radicals. Thus, if for example, a tertiary amine is to be quaternized, at least one mole of an epoxide compound containing a single epoxide group must be added to the amine to produce the desired quaternary salt. If a secondary or primary amine are to be reacted, it is necessary to add at least two and three moles of epoxide compound per mole of amine respectively. For best results, it has been determined that a slight excess of epoxide over that theoretically required should be added to drive the reaction to completion. For reaction with a tertiary amine, best results are achieved with from 1.0 to 1.5 equivalents of epoxide compound per mole of amine. When a secondary amine is reacted, best results are achieved with addition of 2.0–3.0 equivalents of epoxide per mole of amine. Reaction of a primary amine and epoxide is best carried out by reaction of 3–4.5 equivalents of epoxide per mole of amine.

While the quaternary ammonium compounds of the invention may be simply made by mixing the two reactants together or in a common solvent and allowing the reaction to proceed to completion, it has been discovered that surprisingly high yields are realized if one follows the procedure set forth below.

The amine and epoxide reactants should be added to a common solvent comprising a polar organic substance and water. The mole ratio of reactants as added most preferably should fall within the just discussed mole ranges. In order to achieve the desired optimum yields, two critical variants should be followed. First, the pH during the reaction should be continually maintained within the narrow range of 4–8. This is best achieved by periodical addition of mineral or organic acid as the reaction proceeds. Acids as sulfuric, nitric, phosphoric, hydrochloric, acetic, chloroacetic, propionic, oxalic or any other appropriate inorganic or organic substance which acts as a Lewis acid may be usefully employed. Secondly, it has been determined that the proportion of polar organic solvent to water is especially important. For best yields, the total solvent should be comprised of at least 60% by weight of polar organic constituent, and most preferably at least 65%. The polar organic substance may again be chosen from a wide variety of known organic solvents having a substantial degree of polarity. Alcohols such as methanol, ethanol, isopropanol, t-butyl alcohol, glycol ethers as the well-known "Cellosolve" types, acetone, glycol, glycerol, dimethyl sulfoxide, dimethyl formamide, dioxane, etc. may be employed. The most preferred organic solvents have dipole moments of at least 1.0 Debye units ($3 \times 10^{-18}$ esu. cm.). The remainder of the solvent mixture should be made up of water.

In order to show the importance of the ratio of polar organic solvent to water, the following experiments were run. In each instance, a quaternary ammonium compound was synthesized by reaction of an epoxy resin, "Epi Rez," and bishydroxyethylpropyl amine. Forty-five parts by weight of the epoxy resin were added to 30 parts by weight of the amine. In the first experiment, only a polar organic solvent was used, namely, 75 parts by weight of ethylene glycol. The conversion to quaternary was low. The same situation was noted in sole use of a glycol ether solvent. In the third experiment, a solvent mixture comprising 100 parts of ethyl-"Cellosolve" and 30 parts of water was employed as the solvent media but pH control between 6.0 and 8.0 was not effected. Medium conversion was noted in this instance. In the fourth experiment, 100 parts of ethyl-"Cellosolve" and 30 parts by weight of water solvent mixture gave high conversion yields when the pH was controlled throughout the reaction. This run was duplicated in a fifth experiment. In the sixth run, medium yields were noted when 45 parts by weight of isopropyl alcohol and 30 parts by weight of water were used as a solvent mixture. Lastly, sole use of water as a solvent media gave very low conversion results. In each case it was noted that the yields of quaternary ammonium salt were somewhat lower when the pH of the reaction mixture was substantially lower than 4.0 or higher than 8.0.

The temperature of the reaction may be varied over a wide range. In its broadest aspects, the reaction temperature may range as low as room temperature to about the boiling point temperature of the reaction mixture. Again, depending upon the choice of reactants the reaction time may be widely varied. In the usual case, conversion is complete in from about ¼ hour to about 24 hours time. Generally, the quaternizing reaction itself is exothermic. In such cases, the time of the reaction may be measured in terms of allowing the reaction to proceed until a decrease in the exotherm of the reaction is noted by a temperature drop. At this point, reaction is considered essentially complete, and the product may be withdrawn from the reaction zone. If desired, the quaternary ammonium compound may be isolated from the solvent mixture. In many instances, however, the reaction product may be used for its active role in form of the organic-aqueous solvent solution.

The following examples are listed as illustrative of the types of useful quaternary ammonium salts which may be formed.

Example I

In this example, one mole of ethanolamine was reacted with one mole of phenyloxirane in a water-isopropanol mixture. The general procedure just outlined above was followed. The pH was adjusted by appropriate addition of acetic acid. The reaction was run at room temperature and after one hour's time no free amine was found upon analysis.

Example II

In this example, one mole of methylcetyl amine was reacted with one mole of butadiene diepoxide in a solvent mixture of dioxane and water at 100° F., for 4 hours. Nitric acid was the neutralizer. The product contained less than 5% unreacted amine at completion of the run.

Example III

Here, one mole of coca amine was reacted with one mole of bis-phenol A di-epoxide in isopropanol-water solvent at 120° F. for 10 hours. The pH of 6.0–8.0 was maintained by requisite acetic acid addition. Again, the quaternary ammonium salt had substantially no free amine present after the run.

Example IV

One mole of dimethyl hydroxyethyl amine was reacted with 1.5 moles of epoxidized soya bean oil at 130° F. for 14 hours. The solvent mixture was isopropyl alcohol and water. Again, excellent conversion yields of quaternary were achieved.

Example V

One mole of 2-cyanomethyl-2-imidazoline was reacted with one mole of butadiene di-epoxide in a polar organic-aqueous solvent comprising dioxane and water at 130° F. for 14 hours. The neutralizing acid was acetic acid. Less than 10% free amine was noted at completion of the run.

Example VI

One mole of 1-(2-hydroxylethyl)-2-N-heptadecenyl-2-imidazoline was reacted with one mole of bis-phenol A di-epoxide in a water-acetone mixture at 120° F. for 1–2 hours. The neutralizing acid in this example was nitric acid. The final product contained less than 7% free basic nitrogen.

In another embodiment of the invention, a specific and novel way of purifying previously formed quaternaries has been discovered. As first mentioned, prior art quaternaries when formed conventionally generally have the drawback of containing therein a substantial amount of a mixture of amines and amine salts, which together for convenience sake will be termed quaternary impurities. Efforts to drive the reaction to completion and achieve nearly complete conversion to quaternary by alkylation of an amine have proved to be unsuccessful. It has been now discovered that these prior art impure quaternary products may be purified, that is, completely quaternized by reaction of the mixture of quaternary, amine, and amine salt with a non-volatile epoxide compound. The mixture is added to a polar organic-water solvent mixture and free amine and amine salt impurities subsequently reacted with an epoxide compound. The already formed quaternary is not affected during the reaction. Again, to achieve optimum yields the above discussed procedure involving rather close pH control and specific ratio of organic solvent to water should be followed. The epoxide which should be non-volatile at ambient temperatures and pressures reacts with the impurities to produce a substantially fully quaternized final product. The amount of epoxide added is dependent on the amount of impurities present and preferably is added in molar amounts as stated above based, on number of moles of amine and amine salt present.

Again, for best results the non-volatile epoxide should have an epoxide equivalent of at least 70 and more preferably at least 140. Epoxide resins are admirably suited for this purpose of purification, and the epoxy resin should preferably contain from 1.0 to about 9.0 epoxide groups per molecule. More preferably the epoxy resin contains 1.4–8.0 epoxy groups in each molecule.

The following example specifically illustrates purification of quaternary ammonium salts which have been previously synthesized by prior art methods.

Example VII

A benzyl chloride quaternary of coca amine was first synthesized by known techniques of alkylation. After the completion of the run the desired quaternary product contained approximately 15% amine and amine salt impurities. This mixture was dissolved in an isopropanol-water solvent system. To the dissolved impure quaternary was then added an amount of bis-phenol A di-epoxide sufficient to quaternize the unreacted amine and amine salt. The quaternization was run at 130° F. for 14 hours and acetic acid was periodically added in order to adjust the pH of the reaction mixture between 6 and 8. At the completion of the run, substantially all the impurity in the initial quaternary reactant had been chemically transformed into quaternary form.

The quaternary ammonium compounds of the invention are suitable for a variety of uses such as wetting agents, detergents, emulsifying agents, corrosion inhibitors, microbiocides, germicides, fungicides, antistatic agents, etc. The quaternary salts are particularly useful as antistatic agents, that is, as additives useful in substantially reducing the static charge of a base material to which they are added. The antistatic quaternary reagents are simply added in at least an antistatic amount to a material which has a tendency to generate an electrostatic charge. The quaternaries are uniformly disposed in the material to be treated, and a surprising reduction of static electricity is realized.

The quaternaries of the invention may be added to a wide variety of materials which exhibit varying amounts of static electrical charge. For example, textiles such as "Fiberglas," paper articles, rubber, resinous materials, etc., may be usefully treated. The quaternary ammonium salts have particular activity in reducing electrostatic charges on thermoplastic and thermosetting resins. The quaternary ammonium salts show the greatest degree of activity in reducing electrostatic charges of thermoplastic resin materials and most preferably, thermoplastic vinyl materials which have a dielectric constant less than 10.

The following are just a few of the resinous materials which may be treated with the quaternaries of the invention; polyethylene, polystyrene, polyvinylchloride, polyvinylchloride-acetate, polyvinylidenechloride, polytetrafluoroethylene, polyvinylbutyral, polymethylmethacrylate, nylon, cellulose acetate, cellulose nitrate, cellulose acetatebutyrate, phenol-formaldehyde resin, phenol-furfural resin, urea-formaldehyde resin, melamine-formaldehyde resin, polyester, etc.

The above thermoplastic and thermosetting resins, and other materials which generate static electricity are best treated by adding at least 0.01% and more preferably from about 0.01 to about 10.0% of quaternary additive based on the weight of the material to be benefitted. The quaternary is simply mixed by conventional means with the base material. For example, a conventional method of incorporation of antistatic material into a resin such as vinyl resin is accomplished by means of a Banbury mill. The antistatic agent is merely dry blended into the resin melt until a homogeneous dispersion is obtained. Surprising reduction of electrostatic charge is noted upon subsequent finishing of the vinyl resin treated with the antistatic quaternary ammonium salts of the invention.

In yet another embodiment of the invention, it has been determined that the quaternary ammonium salts when added to vinyl resins impart surprising heat-stabilization properly to the resin, and specifically inhibit color change of the resin when it is subjected to substantial heating. Again, the method of incorporation is quite simple and comprises the steps of treating the resin with at least a stabilizing amount of a quaternary ammonium compound falling within the already related structural formula. More preferably, at least 0.01% and most preferably, 0.01–10.0% by weight of quaternary based on the weight of vinyl resin are added to the resin. The thus treated resin has a markedly reduced tendency to darken upon being subjected to heat. The quaternary ammonium salt of the invention show surprising activity in promoting heat-stabilization of vinyl resins when compared to prior art quaternaries. The following example demonstrates the just discussed effect.

Example VIII

To 50 parts of vinyl resin and 50 parts of diisooctyl adipate plasticizer were added one-half part of the quaternary ammonium salt of Example III. The above were thoroughly mixed so that the heat-stabilizing quaternary ammonium salt of Example III was homogeneously dispersed in the resin system. The formulation was then cured for 25 minutes with the temperature ranging from 160° to 175° C. Only a very slight color developed after heating. When no additive was employed, the resin color was extremely dark. Likewise, when a benzyl chloride quaternary salt of coca amine, produced by conventional alkylation methods and containing approximately 15% impurity of amine and amine salts, was added to the resin and plasticizer formulation, the color became extremely dark after the above heating step.

The above demonstrates another facet of the usefulness of the quaternary ammonium salts of the invention. It is believed that the greatly improved activity in promoting heat-stabilization and preventing color darkening is dependent upon the low degree of impurity present in the quaternary ammonium salts of the invention which are substantially completely in quaternary form.

Having thus described our invention, it is hereby claimed as follows:

1. The method of purifying an impure quaternary ammonium salt compound which comprises the step of adding to said impure compound an epoxide compound which is shown in Table II, which is non-volatile at ambient temperature and pressure whereby said impurities in said quaternary comprising unreacted amine and amine salt are also quaternized to produce a final quaternary ammonium salt compound which is substantially fully quaternized, said epoxide being added in an amount sufficient to effect quaternization of said impurities.

2. The method of claim 1 wherein said epoxide compound has an epoxide equivalent of at least 140 and contains 1.0–9.0 epoxide groups per molecule.

3. The method of claim 1 where the reaction is conducted in a polar solvent comprising at least 60% by weight of an organic polar solvent and the remainder water and at pH within the range of from 4–6.

References Cited

UNITED STATES PATENTS

| 2,676,166 | 4/1954 | Webers | 260—2 |
| 2,127,476 | 8/1938 | Ulrich et al. | 260—567.6 |

WILLIAM H. SHORT, Primary Examiner

T. PERTILLA, Assistant Examiner

U.S. Cl. X.R.

260—18, 47, 88.3, 567.6